United States Patent Office 3,188,201  
Patented June 8, 1965

3,188,201  
PROCESS FOR REMOVAL OF ZINC FROM BLAST FURNACE GAS WASH WATER  
Heinrich Sontheimer, Auf dem Seif 9, Falkenstein, Taunus, Germany, and Günter Derenk, Im Finkenschlag 2, Buchschlag, near Frankfurt am Main, Germany  
No Drawing. Filed June 25, 1962, Ser. No. 205,109  
Claims priority, application Germany, June 30, 1961, M 49,525  
5 Claims. (Cl. 75—108)

This invention relates to the treatment of blast furnace gas wash water and specifically to the separation of zinc from blast furnace gas wash water.

It is an object of this invention to provide an improved and economical method for removing zinc from blast furnace gas wash water.

Another object is to provide a method of removing zinc from blast furnace gas wash water which permits the return of the treated water to the process.

Another object is to provide a process of the type referred to wherein the zinc is obtained as a product suitable for working up to zinc or zinc oxide.

Other objects will become apparent upon consideration of the following detailed description of the invention and the claims.

During the reduction of ores in blast furnaces the zinc contained in the ores is vaporized and escapes with the gas through the flue of the furnace. The blast furnace gas is washed to remove dust, and the wash water contains the major portion of the impurities removed from the gas in suspended form. The suspended impurities of the wash water can be separated by sedimentation, if necessary after use of flocculants. A portion of the impurities contained in the blast furnace gas, particularly the finely divided zinc, dissolves during the washing process in the carbon dioxide containing water and forms mostly unstable compounds.

Due to this content of dissolved, unstable compounds, particularly bicarbonates, the wash water is not suitable for return to the process after clarification. It would form in the cooling tower and in the subsequent wash water cleaning system deposits and incrustations due to after-precipitation, which would cause considerable difficulties. Examinations of deposited products of after-precipitation which were obtained in experimental circulation of blast furnace gas wash water showed that these deposits consist largely of zinc compounds.

It is known that zinc compounds dissolved in water can be precipitated by addition of precipitants, e.g., of lime, and be separated. Since blast furnace wash waters are strongly buffered solutions and the precipitation of zinc requires a high pH value, the addition of lime precipitates also the large amount of free carbon dioxide and the carbonate hardness forming substances present in the water, and the alkali bicarbonates contained in the water are converted to insoluble carbonates.

Water resulting from this treatment is not suited for return to the process due to its high alkalinity. Furthermore, the constant use of lime for precipitation of the zinc is expensive, and the precipitate produced creates a sludge disposal problem. In practice precipitation by means of lime for recovery of the zinc and for the stabilization of the wash water is, therefore, impractical.

The process according to the invention makes it possible to sufficiently concentrate the zinc contained in the blast furnace gas wash water in the form of a fine suspension of elementary zinc and of dissolved zinc compounds relative to the other dust-like impurities, that a product suitable for working up to zinc or zinc oxide is obtained.

The vaporized zinc in the blast furnace gas condenses, when cooled, to fine particles which are precipitated by the wash water. Due to the water containing considerable quantities of carbon dioxide, the dissolution of the zinc proceeds rapidly. The dissolved portion of the zinc remains in the water when the wash water is clarified mechanically.

When the mechanically clarified water is aerated, the carbon dioxide contents are driven off and the dissolved zinc compounds precipitate.

In case the waste water coming from the blast furnace gas purification contains too little $CO_2$ in solution, so that an insufficient quantity of zinc remains in solution in this waste water, a $CO_2$ gas treatment, which can be carried out in known manner by means of flue gas or the like, may advantageously precede the process according to the invention. The $CO_2$ gas is applied to the water which contains all solids, prior to any other treatment stage. The quantity of zinc remaining in the waste water after the first treating stage is thereby increased, and this zinc precipitates in the second stage after the aeration. In this manner an increased removal of zinc can be attained.

The process according to the invention comprises subjecting the blast furnace gas wash water containing suspended and dissolved impurities first to a short mechanical clarification, which may be enhanced by the use of flocculation aids, if necessary; then aerating the preclarified water, whereby the dissolved zinc compounds precipitate as colloids or microflocs; and flocculating the fine zinc precipitate by means of flocculants or flocculation aids, such as activated silica. This treatment can be carried out in the usual plants for aeration and clarification of liquids. Advantageously one of the solids contact processes, for example the slurry circulation process, is used.

Example

In a steel mill 400,000 $m.^3$ blast furnace gas measured under standard conditions are produced per hour. For washing of these gases 2000 $m.^3$ of water are required per hour.

The entire quantity of dirty water from the gas purification is passed into a longitudinal clarifier and undergoes sedimentation therein. The detention time in the clarification basin is about 30 minutes. The solids content of the influent to the basin is 500–1000 mg./l. and that of its effluent 50–80 mg./l. The effluent contains from 40–70 mg./l. of dissolved zinc and has a pH of about 7.

The thus pretreated water, which has been largely freed of suspended solids, flows in a free fall into an aeration basin, wherein the water is aerated for 5–10 minutes. The quantity of air required for the treatment of the water is between 0.5 and 1 $m.^3/m.^3$ of waste water with a submergence of about 2 m. The effluent of the aeration basin contains the previously dissolved zinc partly in colloidal and partly in microfloc form. To separate the zinc and the remaining suspended impurities, the water is passed into a combined flocculation and sedimentation basin of the slurry recirculation type. To enhance flocculation, the water is dosed therein with 1–2 mg./l. of activated silica. The effluent of this last treatment stage is substantially free of zinc and contains less than 5 mg./l. of suspended solids, so that it can be reused in the process.

The sludge produced in the last treatment stage is thickened, dewatered and worked up to zinc oxide.

With the process according to the invention, the operating cost (chemical and power cost) per $m.^3$ of water are DM 0.0025, and the water is purified sufficiently that it can be recirculated in the process. With the known method of precipitation, the operating costs for the treatment of the same water are DM 0.024/$m.^3$; further expenses of DM 0.01/m.³ for disposal of the additional sludge produced in this treatment must be taken into consideration. Due to its high alkalinity, the water resulting from this treatment can neither be sent to a stream nor be recirculated without prior pH regulation.

We claim:

1. A method of purifying blast furnace gas wash water containing dissolved zinc and carbon dioxide, comprising separating suspended solids from the gas wash water, thereafter aerating the gas wash water substantially freed of suspended solids to precipitate zinc from solution, and separating the precipitated zinc from the water.

2. A method of purifying blast furnace gas wash water containing dissolved zinc and carbon dioxide for reuse in the gas washing process, comprising clarifying the gas wash water by subjecting it to sedimentation for a period of about 30 minutes, aerating the clarified gas wash water to precipitate zinc from solution, subjecting the wash water to flocculation, separating the resulting flocs from the water, and returning the substantially zinc free water to the gas washing process.

3. A method of separating zinc from blast furnace gas wash water containing dissolved zinc and carbon dioxide, comprising removing settleable solids from the gas wash water, then aerating the gas wash water to remove carbon dioxide and to precipitate zinc compounds from solution, and separating the precipitated zinc compounds from the water.

4. A method of separating zinc from blast furnace gas wash water containing dissolved zinc and carbon dioxide, comprising settling the gas wash water for a short period of time to remove suspended solids therefrom, then aerating the settled gas wash water to remove carbon dioxide and precipitate zinc compounds from solution, flocculating the gas wash water and precipitated zinc, and separating the resulting flocs from the water by sedimentation, whereby a substantially zinc free water is obtained that can be reused in the gas washing process and a zinc sludge that can be dewatered and worked up to zinc.

5. A method of separating zinc from blast furnace gas wash water with a low content of dissolved carbon dioxide, comprising treating the wash water with carbon dioxide to increase its content of dissolved carbon dioxide, subjecting the thus treated wash water to sedimentation, then aerating the settled wash water to remove carbon dioxide and precipitate zinc compounds from solution, and separating the precipitated zinc compounds from the water.

References Cited by the Examiner

UNITED STATES PATENTS

| | | | |
|---|---|---|---|
| 1,879,834 | 9/32 | Waring et al. | 23—183 |
| 1,919,947 | 7/33 | Johnston | 75—120 X |
| 2,695,843 | 11/54 | Schaufelberger | 75—120 |
| 2,839,388 | 6/58 | Van Hare et al. | 75—120 X |

OTHER REFERENCES

Mathewson, Zinc, The Science and Technology of the Metal, Its Alloys and Compounds, Reinhold Publishing Corp., N.Y., 1959, pages 286–297 relied on.

BENJAMIN HENKIN, *Primary Examiner.*

WINSTON A. DOUGLAS, *Examiner.*